United States Patent [19]

Miller

[11] 3,779,088
[45] Dec. 18, 1973

[54] CRANK MECHANISM

[75] Inventor: Bernard F. Miller, Corning, N.Y.

[73] Assignee: Ingersoll-Rand Company, Woodcliff Lake, N.J.

[22] Filed: Aug. 4, 1972

[21] Appl. No.: 277,889

[52] U.S. Cl. .................................. 74/44, 308/3 CH
[51] Int. Cl. ............................................. F16h 27/22
[58] Field of Search .............................. 74/44, 579; 308/3 CH, 2; 123/193; 417/545

[56] References Cited
UNITED STATES PATENTS

| | | | |
|---|---|---|---|
| 2,328,918 | 9/1943 | McManus | 308/3 CH |
| 1,494,146 | 5/1924 | Bowen | 308/3 CH |
| 2,682,433 | 6/1954 | Maier | 308/3 CH |
| 3,616,701 | 11/1971 | Decker et al. | 308/3 CH |

Primary Examiner—Charles J. Myhre
Assistant Examiner—Wesley S. Ratliff, Jr.
Attorney—David W. Tibbott et al.

[57] ABSTRACT

The mechanism comprises a one-piece crosshead and a one-piece auxiliary drive member coupled together for mutual reciprocation, although with a space therebetween, by tensioning tie rods. The crosshead receives a crankshaft connecting rod, the crankshaft being rotatably journaled in a mechanism housing, and the connecting rod being coupled to the crosshead through oversize crosshead pins which oscillate with the translating connecting rod. Replaceable vertical and horizontal guide assemblies effect and maintain planar alignment between the crosshead and drive member.

21 Claims, 4 Drawing Figures

CRANK MECHANISM

This invention pertains to crank mechanisms, and in particular to such crank mechanisms as are required to translate pistons, or plungers, and the like, for compressors or pumps.

Known crank mechanisms typically employ crossheads composed of a plurality of components which, assembled, lack a desired strength and solidity and, consequently are subject to undue failures. Also, the prior art crank mechanisms use the classic connecting rod bearing support in the crosshead where the supporting bearing is wholly confined within a rod-end bore. Thus, either the rod end must be inefficiently large, to accommodate a heavy bearing, or a rod end of substantially standard size can accept a small, light bearing only.

Known crank mechanisms, further, are used with guide assemblies, to effect and maintain a truly linear alignment of the crosshead translation, which are integral with, and therefor not replaceable from, the crosshead and its associated housing. Such an arrangement and construction frustrates due maintenance and repair and renders these services unwarrantedly expensive. Still further, and again concerning maintenance and repair servicing, prior crank mechanisms have to be built into their associated housings; they do not own a structuring which will accommodate "bench assembly" of the connecting rod, crosshead, crosshead pin, guide assembly components, and the like.

It is an object of this invention to teach an improved crank mechanism which has none of the disadvantages just cited.

It is a particular object of this invention to set forth a novel crank mechanism, for use with reciprocating pistons, plungers, and the like, comprising a crankshaft; a crosshead; and a connecting rod pivotally coupled at a first end thereof to said crankshaft and at a second end thereof to said crosshead to effect a reciprocating translation of said crosshead with rotation of said crankshaft; wherein: said second end of said connecting rod is coupled to said crosshead by oversize pins and further including means for causing said pins to oscillate relative to said crosshead in unison with said second end of said connecting rod.

A feature of this invention comprises the use of a one-piece crosshead and a one-piece auxiliary drive member coupled together for mutual reciprocation, although with a space therebetween, by tensioning tie rods. The crosshead receives a crankshaft connecting rod, the crankshaft being rotatably journaled in a mechanism housing, and the connecting rod being coupled to the crosshead through oversize crosshead pins which oscillate with the translating connecting rod. Replaceable vertical and horizontal guide assembled effect and maintain planar alignment between the crosshead and drive member.

Further objects and features of this invention will become more apparent by reference to the following description, taken in conjunction with the accompanying figures, in which.

Figure 1:
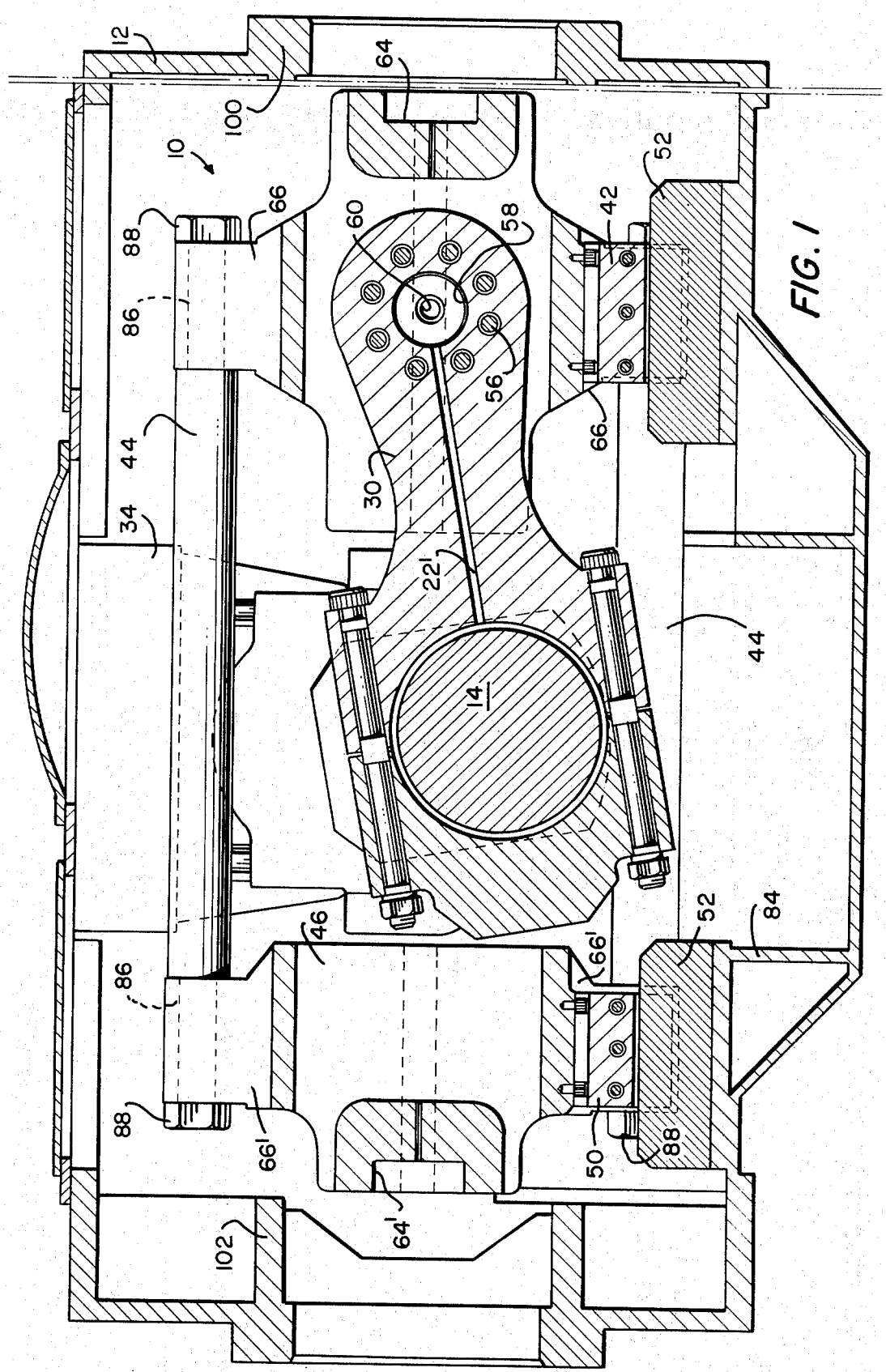
FIG. 1 is a longitudinal section through an embodiment of a crank mechanism, together with its associated housing, according to the invention.
Figure 2:
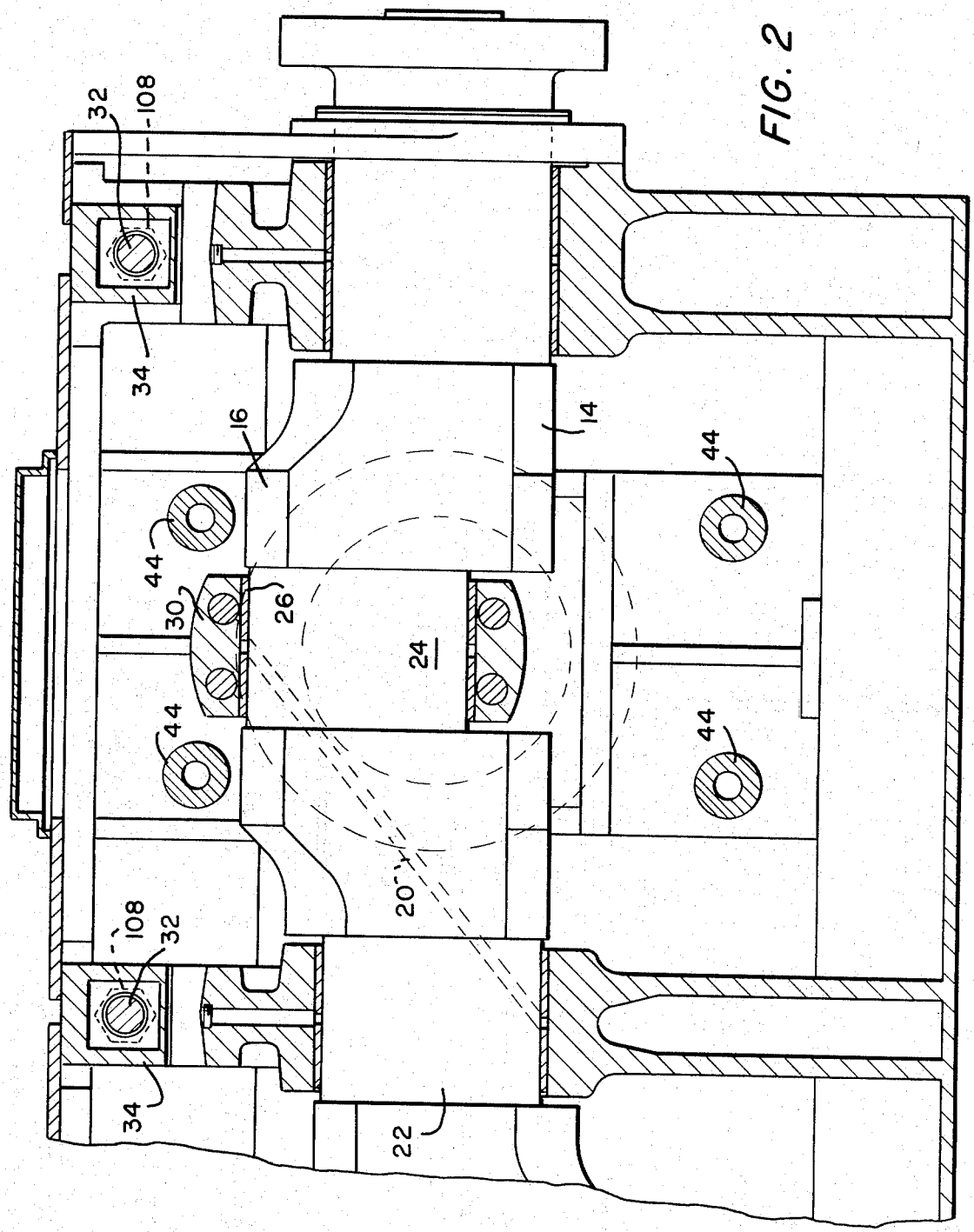
FIG. 2 is a longitudinal section through a portion of the crankshaft; this particular embodiment comprises a pair of the novel crank mechanisms, but only one crank mechanism structure is illustrated.
Figure 3:
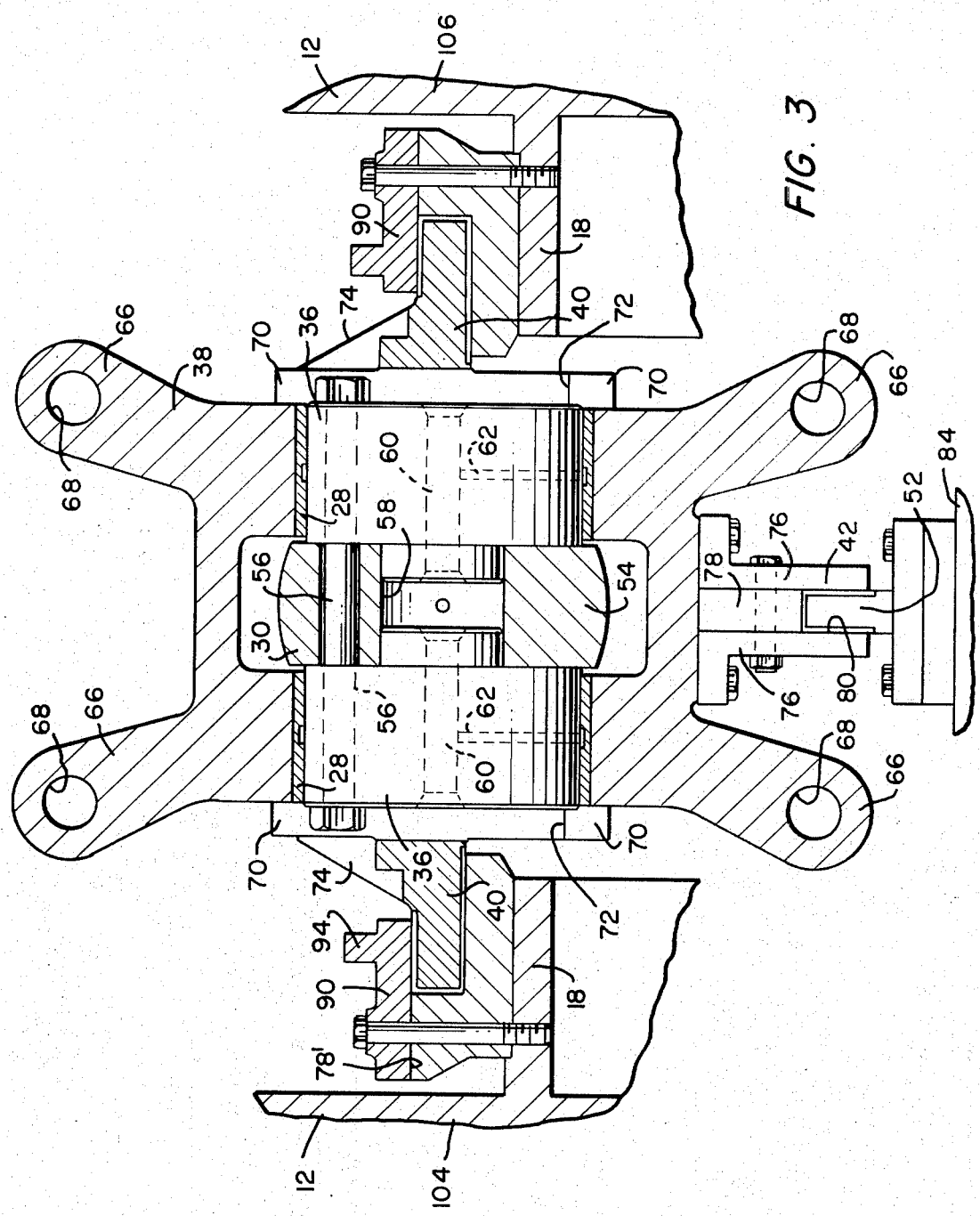
FIG. 3 is a vertical section, taken along the crosshead pins, showing the crosshead and guide assemblies arrangement.
Figure 4:
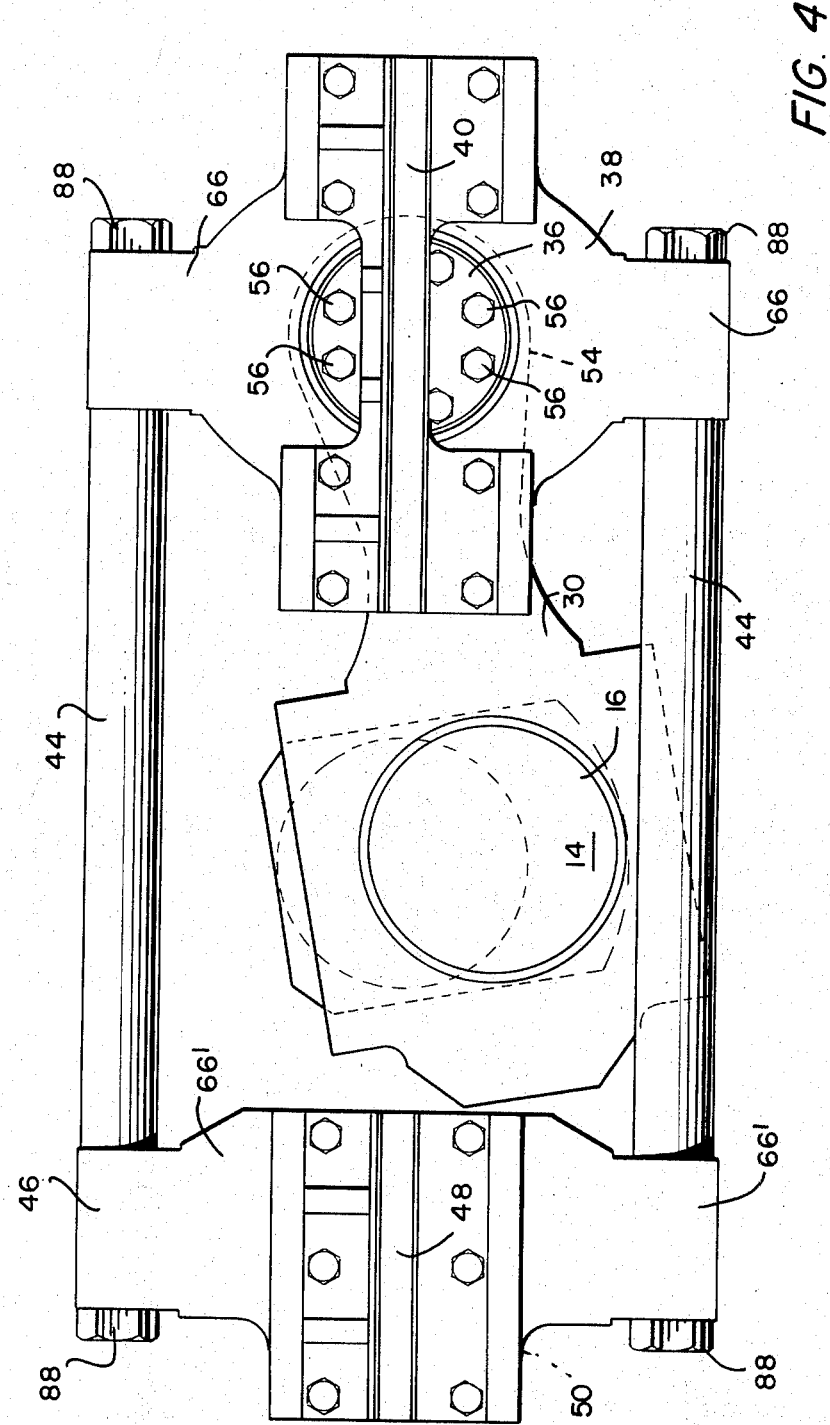
FIG. 4 is a side view of the crosshead, drive and auxiliary drive member assembly.

As shown in FIGS. 1 and 2, the crank mechanism 10 is supported in a housing 12 having journal centers wide enough to allow the mechanism 10 to operate two, directly opposed, in-line pistons or plungers from each crank throw of the crankshaft 14, however, only one crank throw 16 is shown. The housing 12, as seen in FIG. 3, has flat crosshead guide supports 18 built onto it. The crankshaft 14 has an oil hole 20 crossdrilled from the center of the journal(s) 22 to the center of the crank pin 24 to pressure lubricate the crank pin bearing 26 and the crosshead bearings 28 are lubricated via an oil hole 22f drilled through the connecting rod 30. Tie rods 32 with spacers 34 are used to tie the housing together in adjustable tension, to carry reciprocating loads.

The crank mechanism 10 comprises the connecting rod 30, crosshead pins 36, crosshead 38, side crosshead shoe plates 40, a vertical crosshead guide track 42, drive rods 44, auxiliary drive member 46, drive member side shoes plates 48, drive member vertical guide track 50, and vertical crosshead and drive member shoe plates 52.

The connecting rod 30 has the pins, the same being large, of oversize diameter, fixed to its small end 54. These crosshead pins 36 are tied together with through bolts 56 to form an integral unit with rod end 54, and provide a large load-carrying bearing assembly in a comparatively small area. The pins have an outside diameter which is only slightly smaller than the diameter of the arcuately defined peripheral surface of rod end 54. The pins 36 oscillate or slue with the rod end 54. The lubrication oil is carried to center bore 58 in the connecting rod end 54, from the crank pin 24, the bore 58 being disposed between the crosshead pins 36. The oil is then carried through pin oil holes 60 and 62 into the crosshead bearings 28 which are fixed to the crosshead 38.

The crosshead 38 is of one-piece, box construction capable of carrying high loads and has a pocket 64 machined in a wall thereof to mount a piston or plunger connection (not shown). It also has four, integral projecting arms 66 which have bolt holes 68 for attaching the drive rods 44 thereto. The crosshead 38 also has protrusions 70 formed on the sides which form a wide, keyway-type mounting recess 72 therebetween. A horizontal, side, crosshead shoe plate 40 is bolted, replaceably, in these recesses 72 on each side of the crosshead 38.

These side crosshead shoe plates 40 each have a flat bearing surface top and bottom. The weight of the crosshead 38, and downward forces from any plunger or piston load coupled thereto, are carried by these crosshead side shoe plates 40, and the load is transmitted to the protrusions 70 into the crosshead 38. The shoe plates 40 have ribs 74 to prevent bending and deflection of the bearing surfaces.

The crosshead 38 also has the vertical guide trace 42 attached to the bottom, the same comprising a pair of mirror-image angle components 76 tied together through a shim element(s) 78 with bolts to form a trackway 80. A vertical crosshead shoe plate 52 is fastened to the base 84 of housing 12. The purpose of this shoe plate 52 is to cooperate with the trackway 80 to maintain vertical alignment of crosshead 38. The guide track shim element(s) 78 are used to adjust the running clearance with the vertical shoe plate 52.

The auxiliary drive member 46 is attached to the crosshead 38 by means of the four drive rods 44. The rods 44 comprise hollow tubes, in this exemplary embodiment, to minimize the weight thereof and the inertial forces which heavy, solid rods would produce. Studs 86 and nuts 88 are used to connect the rods 44 to arms 66 of the crosshead 38 and to similar four, integral, projecting arms 66′ of the one-piece drive member 46. The studs 86 (and nuts 88) tension the drive rods 44, to maintain the drive member 46 and crosshead 38 as an integral assembly. Of course, during mechanism operation, the rods 44 are under a compressive load. The drive member 46 has side shoe plates 48 bolted to the sides in the same way as the crosshead, and also has the vertical guide track 50 attached to the bottom thereof for engagement with a vertical shoe plate 52, replaceably fixed to the base 84 of the housing 12, for maintaining vertical alignment of the drive member 46. This member 46 is also of box-like construction, however, it does not have a bore for a crosshead pin. It does have a pocket 64′ in a wall thereof for mounting a piston, plunger, or the like, thereto.

The crosshead 38 and drive member 46 side shoe plates 40 and 48 ride within replaceable guide tracks 90 (shown) and 92 (not shown) attached to the guide supports 18 within housing 12. The shoe plates are, in turn, guided by the horizontal trackway of tracks 90 and 92. Again, shim element(s) 78′ is provided to adjust proper running clearance and to maintain horizontal alignment of the crosshead 38 and drive member 46.

When the crankshaft 14 rotates, the crank throw 16 gives a reciprocating motion to the crosshead 38 by means of the connecting rod 30. This motion will acuate a plunger, or whatever, attached to the crosshead 38. At the same time, this motion is also transmitted to the auxiliary drive member 46 by means of the four drive rods 44 which are attached in common to both. These drive rods pass over and below the crank throw 16 which allows the latter to rotate without interfering with the reciprocating components. The dirve member 46 also, then, will acuate a plunger, or the like, attached to it in line with any crosshead-attached plunger, etc. The horizontal guide tracks and shoe plates maintain horizontal alignment, while the vertical guide tracks and shoe plates maintain vertical alignment. Since these shoe plates are comparatively thin, a temperature growth during operation does not effect the alignments.

The advantages of this novel crank mechanism 10 are many. The reciprocating loads are transmitted through rugged, one-piece-construction crossheads 38 and drive members 46. The crosshead 38 and drive member 46 are connected by comparatively light-weight, stiff drive rods 44 (which, in cidentally, can be tightened with heaters or with hydraulic stud tensioners). The guide tracks 90 and 92 are backed up, for a large portion of their length by ribbing 94 to prevent any large deflection and bending stressed. The side and and vertical guide components, shoe plates and tracks, are easily removable for repair or replacement of the wearing surfaces, without costly repair to the crosshead 38 and drive member 46. The drive rods 44 can be repaired or replaced without affecting the whole mechanism 10. The connecting rod 30, crosshead 38, pins 36, and shoe plates and tracks assemblies can be bench-assembled prior to insertion in the housing 12. The thin shoe plates prevent large temperature growth from affecting alignment. Further, the design provides a compact unit for size versus load ratio.

The housing 12 comprises the base 84, end frame elements 100 and 102 which rise from the base, and side walls 104 and 106 joined to sides of the frame elements and to the base. Thus, the housing defines a cradle or repository for mounting the crankshaft 14 and receiving the crank mechanism 10.

The spacers 34 are set in, between frame elements 100 and 102, with an interference fit, and the tie rods 32 constrain the elements and spacers together. Threaded fasteners 108, at either ends of the rods 32, provide for adjustment of the constraint.

While I have described my invention in connection with a specific embodiment thereof it is to be clearly understood that this is done only by way of example and not as a limitation to the scope of my invention or set forth in the objects thereof and in the appended claims.

I claim:

1. A crank mechanism, for use with reciprocating pistons, plungers, and the like, comprising:
   a crankshaft;
   a crosshead; and
   a connecting rod pivotally coupled at a first end thereof to said crankshaft and at a second end thereof to said crosshead to effect a reciprocating translation of said crosshead with rotation of said crankshaft; wherein:
   said second end of said connecting rod is coupled to said crosshead by large pins; and further including
   means for causing said pins to oscillate, relative to said crosshead, in unison with said second end of said connecting rod.

2. A crank mechanism, according to claim 1, wherein:
   said second end of said connecting rod and said pins are caused to oscillate about a given axis; and
   said pins and said second end of said connecting rod are fixed together along said axis.

3. A crank mechanism, according to claim 2, wherein:
   said pins comprise a pair of identical pins; and
   said second end of said connecting rod is interposed between said pins of said pair; and further including
   fasteners in common penetration of said pins and said second end of said connecting rod.

4. A crank mechanism, according to claim 3, wherein:
   said crosshead has a large bore formed therein;
   said pins are pivotally mounted within said bore; and further including
   bearings interposed between said pins and said bore; and wherein
   said crosshead further has a recess formed therein, intermediate opposite ends of said bore, said recess having one fully open side; and
   said second end of said connecting rod is supported within said recess by said pins, a portion of said connecting rod, which is intermediate said first and second ends thereof, is free to slue within said open side and said recess.

5. A crank mechanism, according to claim 1, wherein:
said second end of said connecting rod has an arcuately formed peripheral surface thereat, and an oscillating axis which lies transverse to said peripheral surface;
said peripheral surface of said second end has a given outside diameter; and
said pins have a common outside diameter only slightly smaller than said given outside diameter.

6. A crank mechanism for use with reciprocating pistons, plungers, and the like, comprising:
a crankshaft;
a crosshead; and
a connecting rod pivotally coupled at a first end thereof to said crankshaft and at a second end thereof to said crosshead to effect a reciprocating translation of said crosshead with rotation of said crankshaft; wherein
said second end of said connecting rod is coupled to said crosshead by large pins; and further including means for causing said pins to oscillate, relative to said crosshead, in unison with said second end of said connecting rod; wherein
said second end of said connecting rod and said pins are caused to oscillate about a given axis;
said pins and said second end of said connecting rod are fixed together along said axis;
said pins comprise a pair of identical pins; and
said second end of said connecting rod is interposed between said pins of said pair; and further including
fasteners in common penetration of said pins and said second end of said connecting rod; wherein
said crosshead has a plurality of limbs projecting therefrom transverse to said axis; and further including
an auxiliary drive member, wherein
said drive member also has a plurality of limbs projecting therefrom;
drive rod means replaceably and fixedly coupling said crosshead limbs to said drive member limbs, in spaced-apart relationship, to effect coincident reciprocating translation of said drive member with said crosshead; and
said drive member and said crosshead each have means for receivably coupling thereto a piston, a plunger, or the like.

7. A crank mechanism, according to claim 6 wherein: said drive rod means comprise hollow tubes.

8. A crank mechanism, according to claim 6, wherein:
said drive rod means comprises means for minimizing an integral force generated by said drive rod means with reciprocating translation thereof.

9. A crank mechanism, according to claim 6, wherein:
said crosshead and said drive member are each of unitized, one-piece construction.

10. A crank mechanism, according to claim 9, further including:
guide means, coupled to said crosshead and said drive member, for aligning said crosshead and said drive member together in a first linear plane which lies perpendicular to said axis, and in a second linear plane, rotated from said first plane, which is also perpendicular to said axis, and for maintaining said planar alignments during reciprocating translation of said crosshead and said drive member.

11. A crank mechanism, according to claim 10, wherein:
said guide means comprises a housing for mounting said crankshaft for rotation therewithin, and for replaceably receiving said connecting rod, crosshead, and drive member therewithin;
said housing having a base, first and second spaced-apart frame elements fixed to and rising perpendicularly from opposite ends of said base, and a pair of wall elements fixed to said base and said frame elements;
said crankshaft is rotatably journaled in said wall elements; and
said guide means further comprises at least one pair of guide assemblies, one assembly replaceably coupled to said base and to said crosshead, and one assembly replaceably coupled to said base and to said drive member.

12. A crank mechanism, according to claim 11, wherein:
said guide means further comprises at least two other pairs of guide assemblies one pair replaceably coupled to one of said wall elements and to said crosshead, and one pair replaceably coupled to another of said wall elements and to said drive member.

13. A crank mechanism, according to claim 11, further including:
spacer means interpositioned between said frame elements with an interference fit; and
means coupling said frame elements together in adjustable constraint.

14. A crank mechanism, according to claim 12, wherein:
each of said guide assemblies comprises first means defining a shoe plate for slidable, guided movement thereof in a guide track, and second means defining a guide track for slidably engaging said shoe plate.

15. A crank mechanism, according to claim 14, wherein:
said crosshead has said guide track replaceably fixed to the bottom thereof, said guide track extending perpendicularly and downward from said bottom for slidable engagement with s shoe plate; and
said housing has said shoe plate replaceably fixed therewithin to said base, said shoe plate extending perpendicularly and upward from said base for slidable engagement with said crosshead guide track.

16. A crank mechanism, according to claim 14, wherein:
said guide assemblies each further comprise shim means carried by one of said first and second means for selectively adjusting a sliding clearance between said shoe plate and said guide track.

17. A crank mechanism, according to claim 15, wherein:
said crosshead further has a pair of shoe plates, replaceably fixed, one shoe plate to each of two opposite sides of said crosshead, said shoe plates extending perpendicularly and horizontally from said crosshead for slidable engagement with a pair of guide tracks; and said housing further has a pair of guide tracks replaceably fixed therewithin to said wall elements, one guide track extending perpendicularly and horizontally from each of said wall elements for slidable engagement with said crosshead shoe plates.

18. A crank mechanism, according to claim 15, wherein:
said drive member has a guide track replaceably fixed to the bottom thereof, said guide track extending perpendicularly and downward from said bottom for slidable engagement with a shoe plate; and
said housing has another shoe plate replaceably fixed therewithin to said base, said another shoe plate extending perpendicularly and upward from said base for slidable engagement with said drive member guide track.

19. A crank mechanism, according to claim 18, wherein:
said drive member further has a pair of shoe plates, replaceably fixed, one shoe plate to each of two opposite sides of said drive member, said shoe plates extending perpendicularly and horizontally from said drive member for slidable engagement with a pair of guide tracks and
said housing further has another pair of guide tracks, replaceably fixed therewithin to said wall elements, one guide track extending perpendicularly and horizontally from each of said wall elements for slidable engagement with said drive member shoe plates.

20. A crank mechanism, according to claim 19, wherein:
said housing has support members welded thereto for mounting said guide tracks thereat;
said housing guide tracks are replaceably fastened to said support members; and
each of said housing guide tracks comprises a plurality of components replaceably fastened together to define a shoe plate trackway between said components and to confine a shoe plate releasably therewithin for slidable movement along said trackway.

21. A crosshead, for use in a crank mechanism, comprising
a crosshead body of one-piece, unitized structure;
said body having a bore formed therethrough for receiving crosshead pins therewithin, and having a walled chamber formed therewithin, intermediate opposite ends of said bore, for receiving an end of a connecting rod thereat, said chamber being fully open at one side thereof to accommodate an oscillation of an end of a connecting rod, therewithin;
translating guide means replaceably fixed to said body, for establishing and maintaining translating alignments of said body; and
said body having spaced-apart prominences extending therefrom, at opposite sides thereof, which cooperatively define key-way-type, laterally-disposed recesses; wherein
said guide means comprise at least one pair of guides, and said recesses each receive one guide of said pair.

* * * * *